United States Patent Office 3,565,938
Patented Feb. 23, 1971

3,565,938
PROCESS FOR PREPARATION OF PERESTERS FROM ORGANO-PEROXYBORATES
Charles N. Winnick, Teaneck, N.J., assignor to Halcon International, Inc., a corporation of Delaware
No Drawing. Filed Dec. 12, 1967, Ser. No. 689,771
Int. Cl. C07c 69/00
U.S. Cl. 260—453                     5 Claims

ABSTRACT OF THE DISCLOSURE

This invention relates to a process for the manufacture of peresters and more particularly to such a process wherein the peresters are prepared by reaction between an organo-peroxyborate and a carboxylic acid. In particularly preferred embodiments, this invention relates to processes for the manufacture of secondary and tertiary alkyl peresters and especially to the manufacture of tertiary alkyl peracetates perbenzoates, perpivalates and perisobutyrates such as for example t-butyl peracetate and perbenzoate.

BACKGROUND OF THE INVENTION

Peresters are valuable articles of commerce being useful as, for example, polymerization catalysts. Heretofore, peresters have been manufactured primarily by reactions between hydroperoxides and acid halides or acid anhydrides. Such prior art methods are of somewhat restricted utility because of the limited number of acid halides and acid anhydrides that are commercially available. Moreover, the prior art methods having required the presence of very substantial mounts of alkaline materials in the reaction in order to obtain the desired products—usually of the order of one mol of basic material per mol of acid chloride or anhydride. Especially when acid anhydride reactants were used to presence of this basic material has caused very substantial yield losses through salt formation. Further, these prior art reactions are highly exothermic, resulting in substantial safety hazards unless extreme precautions are taken to control the reaction with great precision—thereby increasing expense of these prior art methods. Accordingly, the art has been faced with need for a flexible and straightforward method for obtaining such peresters simply and safely. Such a method is provided by the process of this invention.

SUMMARY OF THE INVENTION

In accordance with this invention peresters are prepared by the reaction between the carboxylic acid to be peresterified and an organo-peroxyborate. The products of the reaction are the desired perester product and boric acid, most of which precipitates from the reaction medium as a solid and can therefore be readily removed by, for example, centrifugation or filtration. The overall chemistry can best be appreciated by consideration of the following chemical equation. For purposes of illustration, but without intending to be limited thereby, the following equation employs, as the reactants, tri-(t-butyl-peroxy) orthoborate and acetic acid:

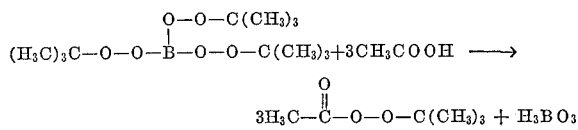

DETAILED DESCRIPTION OF THE INVENTION (A) Reactants (1) The organo-peroxyborate.—A wide variety of organo-peroxyborates can be used in the practice of this invention. Both ortho and meta peroxyborates can be used. Of these, the ortho peroxyborates are preferred because of their greater availability and ease of preparation. Thus, the organo-peroxyborates suitable for use in the practice of this invention are of the following chemical structure:

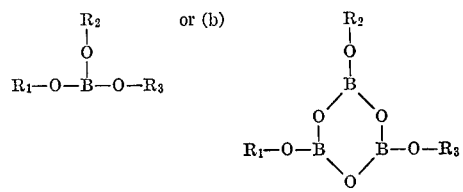

As will be appreciated by one skilled in this art, structure (a) above is that of the orthoborate while structure (b) is that of the metaborate. In the above formulae, $R_1$, $R_2$ and $R_3$ are each selected from the group consisting of hydrogen, R and OR with at least one of the triad being OR, i.e., at least one of the substituent groups being organo-peroxy. R, as used in the immediately preceeding sentence, is an organic radical which can be alkyl, substituted alkyl, alkenyl, substituted alkenyl, cycloalkyl, substituted cycloalkyl, cycloalkenyl, substituted cycloalkenyl, aralkyl, substituted aralkyl, aralkenyl, substituted aralkenyl, aryl or substituted aryl. Desirably R contains from 1 to 30 carbon atoms and preferably contains 1 to 20 carbon atoms. Of the foregoing, R desirably is alkyl or aralkyl and preferably is tertiary alkyl, e.g., t-butyl, 2-methylbutyl, 2-methylpentyl or t-amyl. The particularly preferred aralkyl species include the alpha-phenylethyl and alpha, alpha-dimethylphenyl peroxyborates. It is also preferred that the organo-peroxyborate be completely peroxidized, i.e., that substantially all of $R_1$, $R_2$ and $R_3$ be-OR in order to minimize by-product formation.

By "substituted" as used in the immediately preceding paragraph, is meant organic radicals containing electrophilic or nucleophilic substituents such as, for example, halogen, nitro, alkoxy, thio or nitrilo radicals.

In cases where more than one of $R_1$ $R_2$ and $R_3$ are —OR, R can be the same or different organic radicals. Obviously, mixtures of organo-peroxyborates can be employed although in such cases mixtures of perester products are thereby obtained.

Exemplary of suitable organic radicals (i.e., R as used in the immediately preceding paragraphs) are the following:

Alkyl:
    methyl
    ethyl
    isopropyl
    propyl
    t-butyl
    2-methyl-2-butyl
    neopentyl
    2-methyl-2-pentyl
    n-octyl
    3-methyldecyl
    Other n- and iso alkyl radicals containing up to 30 carbon atoms.

Substituted alkyl:
    methoxymethyl
    chloropropyl
    acetylaminohexyl
    9-methylthio-n-octadecyl
    4-nitro-2-pentyl
    1-bromo-2,2,4-trimethyl-4-pentyl
    methyl-sulfonyl-ethyl Alkenyl:
vinyl
allyl
methallyl
3-butenyl
3-methylpentyl
3-heptenyl
5-isopropyl-2-decenyl
2-hept-3-enyl
4 hexadeca-5,7-dienyl Substituted alkenyl:
2,2-dichlorovinyl
pentafluoroallyl
2-(2-chloroethyl)-1-butenyl-3
1-hydroxy-4,5-dimethylhexen-6-yl-4
2-methyl-4-methyl-disulfido-buten-1-yl-3
3-(2-methyl-5,6-diazahept-1-ene)
3-(4-(1--vinylcyclo-2-oxa-5-thiahexane-2)-butene-1-yl)
3,4,4,5,5-pentamethyl-6-nitro-hexen-1-yl-3

Cycloalkyl:
cyclopropyl
methylcyclopropyl
dimethylcyclopropyl
cyclobutyl
ethylcyclobutyl
tetradecylcyclobutyl
methlethylcyclobutyl
cyclopentyl
tetramethylcyclopentyl
isobutylpentyl
cyclopentyl
cyclohexyl and alkyl substituted cyclohexyl such as methylcyclohexyl
cyclododecyl Substituted cycloalkyl:
bromocyclobutyl
cyanocyclohexyl
triethyl-nitrocyclooctyl
diamino-methylcyclohexyl Cycloalkenyl:
cyclobutenyl
3-methylcyclobutenyl
cyclopentenyl
cyclohexenyl
3-methylcyclohexenyl
2-bicycloheptenyl
2-bicycloheptadienyl Substituted cycloalkenyl:
4-iodocyclohexenyl
2-methyl-4-mercaptocyclohexenyl
2-ethoxycyclobutyl
3-t-butyl-6-cyanocyclooctyl Aralkyl:
phenylmethyl
2-(2-methylphenyl)ethyl
2-(2-phenyl)propyl
1-(1-naphthylbutyl)
2-(5,6-benzocyclohexyl)
1-(4,5-naphthocyclohexen-2-yl)

Substituted aralkyl:
2-(4-iodo-5,6-benzocyclohexyl)
1,2,3,4-tetrahydro-7-nitrilonaphthyl-2
1,2,3-trihydro-4-mercaptophenanthranyl-1
alpha, alpha-dimethyl-4-nitrophenylmethyl Aralkenyl:
1-phenyl-1-methylpropen-1-yl-3
2-phenylbuten-1-yl-3

Substituted aralkenyl:
2-(p-n-butoxyphenyl)buten-1-yl-3
1-(4-amino-1-naphthyl)-2,4-dimethyl-penten-4-yl-3

Aryl:
phenyl
4-methylphenyl
3,5-dimethylphenyl
o-butylphenyl
2-biphenyl
2-(2'-methylbiphenyl)
2-naphthyl
1-naphthyl
1-(3-methylnaphthyl)
9-anthranyl
phenanthranyl
tetradecylphenyl Substituted aryl:
p-octoxyphenyl
4-chloro-1-naphthyl
m-acetylphenyl (2) Preparation of the organo-peroxyborate.—Processes for the manufacture of organo-peroxyborates are known to those skilled in the art and are described in the literature. See, for example, Steinberg and McCloskey (editors) Progress in Boron Chemistry, vol. 1, Macmillan, New York (1964) at page 265 et seq. Particularly suitable processes for the preparation of the organo-peroxyborate reactant are also disclosed in copending application Ser. No. 510,366, filed Nov. 29, 1965, now abandoned.

According to this co-pending application, a particularly advantageous method for the preparation of organo-peroxyborate is by the reaction of an organic hydroperoxide with an alkoxy borane or boric acid or a boron oxide. One of these methods is illustrated by the following chemical equation:

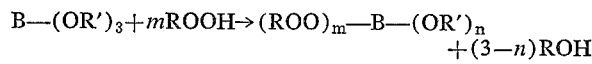

$$B—(OR')_3 + mROOH \rightarrow (ROO)_m—B—(OR')_n + (3-n)ROH$$

In this equation, $m$ is an integer of 1 to 3, $n$ is an integer of 0 to 2, and $m+n=3$. As used in this equation, $R'$ is hydrogen or a lower alkyl radical having 1 to 6 carbon atoms and R is as heretofore defined.

During the reaction, a hydroxyl compound is formed and this must be removed from the reaction zone as the reaction proceeds. When the starting material for the preparation of the organo-peroxyborate is a boric acid the hydroxyl compound co-product is water. Similarly, when the boron reactant is a trialkoxyborane the co-product of the reaction will be the alcohol or alcohols corresponding to the alkyl substituents of the boron compound. As stated, whether the boron compound is a trialkoxyborane or a boric acid, the hydroxyl compound co-product is removed from the reaction zone as the reaction proceeds.

The reaction for the preparation of the organo-peroxyborate is conveniently carried out at temperatures within in the range of from about 40° C. to about 175° C. at pressures which are normally within the range of from 1 to 50 p.s.i.a. The molar proportions of the reactants, expressed as moles of hydroperoxide per atom of boron, preferably ranges from 1:10 to 10:1 and most suitably is in the range of from 1:2 to 2:1.

Specific examples of peroxyborates which can be prepared in this manner and which are useful starting materials for the process of this invention, are dimethoxy-alpha-phenylethylperoxyborate, methoxy-di-alpha phenylethylperoxyborate, tri-(alpha-phenylethylperoxy) borate, the corresponding alpha, alpha-dimethylperoxyborates, the corresponding ethoxy, n-propoxy, 1-propoxy compounds, di-(tertiary butoxy)-tertiary butylperoxyborate, tertiary butoxy di-(tertiary butylperoxy) borate, tri-(t-butylperoxy) borate, and the like. Of these, compounds such as tri-(alpha-phenylethylperoxy) borate, tri-(t-butylperoxy) borate and tri-(cumylperoxy) borate are preferred.

(3) *The carboxylic acid.*—As in the case of the organo-peroxyborate, a wide variety of carboxylic acids can be used in the practice of the process of this invention. Mono- or polybasic alkyl, aromatic or alkylaromatic carboxylic acids are suitable as also are acids of the foregoing types which also contain other functional groups such as, ether, halogen, nitro or carbalkoxy substituents. Illustrative alkyl mono-basic carboxylic acids are, for example, formic acid, acetic acid, propionic acid, n- and isobutyric acids, valeric acid, pivalic acid, myristic acid, stearic acid, acrylic acid, methacrylic acid, crotonic acid, sorbic acid, angelic acid and tiglic acid. Suitable alkyl polybasic carboxylic acids include oxalic, malonic, succinic, glutaric, adipic, pimelic and azelaic acids as well as, for example, maleic and fumaric acids, glutaconic acid, 2-octenedioic acid, 5-octene-3,3,6-tri carboxylic acid and the like. Suitable mono-basic aromatic and alkyl aromatic carboxylic acids include benzoic acid, cinnamic acid, o-m-p-alkyl substituted benzoic acids, p-chlorobenzoic acid, acetylsalicylic acid, alpha- and beta-naphthoic acids and the like. Suitable aromatic polybasic carboxylic acids include the phthalic acids such as terephthalic acid, trimesic acid and the like. Suitable alkylaromatic polybasic acids include the alkyl substituted phthalic acids such as, for example, 2-ethyl terephthalic acid, 4-isopropyl phthalic acid and the like.

As in the case of the organo-peroxyborate, it is also possible to use mixtures of carboxylic acid reactants but, in such a case, mixtures of perester products are obtained.

In most cases, it is generally desired to use the mono-basic alkyl or aromatic carboxylic acids and it is preferred to employ such of these acids as contain 10 or fewer carbon atoms per molecule. The use of benzoic, acetic, isobutyric and pivalic acids is especially preferred since the peresters of these acids are the most commonly desired of the peresters.

(B) *The perester formation reaction*

The reaction is conducted in the liquid phase by admixing the organo-peroxyborate with the carboxylic acid under suitable conditions. Suitable temperatures are within the range of from −20° C. to about 125° C. desirably within the range from about 0° C. to about 60° C. and preferably within the range of from about 20° C. to about 40° C. Pressures ranging from about 1 p.s.i.a. to about 100 p.s.i.a. or higher can be employed.

The reaction can be conducted with or without a solvent although the use of solvents is normally desired. Suitable solvents are those organic materials which are inert under the conditions of the reaction and include the aromatic hydrocarbons, the cycloaliphatic hydrocarbons having at least 6 carbon atoms per molecule, the saturated aliphatic hydrocarbons having at least 7 carbon atoms per molecule and those t-alcohols, ketones and ethers which are relatively non-reactive in the systems employed. Mixtures of solvents can also be used. Exemplary of satisfactory solvents are benzene, toluene, cyclohexane, n-heptane, mineral spirits, t-butanol, methylethyl ketone, diethyl ether and the like.

The ratio of carboxylic acid to organo-peroxyborate employed in the reaction of this invention is not critical and, on a molar basis, can be within the range of from 1:10 to 30:1. However, it is desired that the molar ratio of carboxyl groups of the carboxylic acid to the peroxide groups of the organo-peroxyborate be at least about 1. Greater ratios of carboxyl to peroxy groups are desirable, particularly when incompletely peroxidized organo-peroxyborates (i.e., peroxyborates of the above structural formulae wherein at least one of $R_1$, $R_2$ or $R_3$ is R) are employed since completeness of reaction is enhanced thereby. In general, it is preferred not to employ molar ratios of carboxyl groups to peroxide greater than about 5 since little advantage is obtained thereby.

The reaction can be conducted catalytically or non-catalytically although catalysts are desirably employed to increase the rate of reaction. Suitable catalysts for increasing the rate of this reaction are strong acids, for example, sulphuric acid, perchloric acid, p-toluenesulphonic acid, boron trifluoride. Cationic ion exchange resins such as the sulfonated polystyrenes can be used. In addition to the strong acids, esterification catalysts can be employed, such as, for example, salts of zinc, antimony, cadmium and lead, such as the chlorides, acetates, naphthenates, etc. When used, catalyst concentrations are desirably within the range of 0.01% to about 5.0% by weight of the total reacting mass. Catalyst concentrations in excess of about 5% by weight of the total reacting mass can be employed although little advantage is obtained thereby.

Suitable reaction times for the conduct of the process of this invention vary dependent upon the precise reactants employed. Generally, reaction times between about 1 minute and about 48 hours are suitable. Employing the preferred reactants discused above in conjunction with suitable catalysts and solvents, reaction times will generally be within the range of about 10 minutes to about 24 hours.

After completion of the reaction, the perester product may be recovered in a variety of ways. One such recovery procedure involves filtration or centrifugation to remove the boric acid by-product yielding a crude perester product as the filtrate. Alternatively, once the reaction is completed, the boric acid can be solubilized by, for example, contacting the reaction effluent with sufficient water or other solvent to dissolve the boric acid. The crude perester product can then be refined by washing it with water and/or aqueous alkaline materials, e.g., alkali or alkaline earth metal carbonates, bicarbonates, hydroxides, etc., to remove unreacted acid, catalysts and residual boron. The resulting product is then satisfactory for use in such commercial applications as, for example, as polymerization catalysts.

EXAMPLES

The following examples are presented to further illustrate this invention but are not intended as limiting the scope therof. Unless otherwise stated, all parts and percents in the following examples are by weight.

Example I

Tri-(t-butylperoxy) borate is prepared as follows: To a reaction system, comprising a reaction vessel in conjunction with an 18 plate Oldershaw-type distillation column, is charged 91.7 parts of a solution of t-butyl hydroperoxide in benzene (39.1% hydroperoxide) and 404.5 parts of tri-methyl borate. After these materials are charged, the reactor contents are heated at atmospheric pressure. Vapors shortly begin to be generated and these vapors are fed to the distillation column. The initial overhead product of the distillation column is an azeotrope of methanol and tri-methyl borate (boiling point is 55° C.). When methanol is no longer evolved from the reactor, the pressure in the reaction system is reduced to 300 mm. Hg and residual trimethyl borate is removed from the reactor. During the removal of residual trimethyl borate, the distillation column operates with an overhead temperature of 45° C. and a reflux ratio of 5:1. Removal of residual trimethyl borate is essentially complete when the reactor (i.e., still-pot) temperature is 74° C. In this manner, 78.7 parts of tri-(t-butylperoxy) borate are obtained in the form of a solution in benzene. Upon hydrolysis of a portion of this mixture and iodometric titration thereof, this material is found to contain 3.775 millimoles of t-butyl hydroperoxide per gram.

Employing the tri-(t-butylperoxy) borate prepared as described above, t-butyl peracetate is prepared as follows:

To a reactor are charged 2.5 parts of the tri-(t-butylperoxy) borate solution in benzene, 1.15 parts of acetic acid and 0.03 part of 98% sulphuric acid. The reactor is maintained at room temperature and atmospheric pressure. After 2 hours, solid boric acid begins to precipitate from the reaction medium and after 7 hours the reaction appears to be complete.

The effluent from the reaction is filtered and water washed. Analysis indicates a molar yield of approximately 80% of t-butyl peracetate, based on peroxyborate charged.

Example II

The procedure of Example I is repeated employing 0.003 part of $H_2SO_4$ as catalyst, a reactor temperature of 60° C. and a reaction time of three hours. The yield of t-butyl peracetate (based on TBHP equivalent) is 50%.

Example III

The procedure of Example I is repeated except that 2.3 parts of benzoic acid are employed in place of acetic acid. An 82% yield of t-butyl perbenzoate is obtained.

Example IV

Example I is repeated with 1.03 parts of phthalic acid in lieu of acetic acid. A reactor temperature of 35° C. and a reaction time of five hours are used. 63% yield of di-tertiary butyl perphthalate is obtained.

Example V

The procedure of Example I is repeated employing 0.43 part of oxalic acid in place of acetic acid. No catalyst is used. Reactor temperature is 45° C. and reaction time is eight hours. The yield of di t-butyl peroxalate is 47%.

Example VI

Tri (t-amylperoxy) borate is synthesized from t-amyl hydroperoxide in a manner substantially identical to that used for the operation of tri (t-butylperoxy) borate in Example I. The solution of peroxyborate in benzene is analyzed (after hydrolysis) and found to contain 2.50 millimoles of hydroperoxide per gram.

To 10 parts of this solution are added 3.0 parts of acetic acid and 0.13 part of $H_2SO_4$ (98%). After eight hours at rom temperature a yield of 78% (mol basis) of t-amyl peracetate is obtained.

Example VII

Tri (alpha-phenylethylperoxy) borate is synthesized in substantially the same fashion employed for the t-butyl derivative in Example I, except that ethylbenzene is employed as the solvent instead of benzene. The solution contains 1.60 millimoles of hydroperoxide (after hydrolysis) per gram.

To ten parts of this solution are added 4.74 parts of propionic acid and 0.07 g. of 98% $H_2SO_4$. The mixture is is allowed to remain at room temperature with agitation for 16 hours. The yield of (alpha-phenyl ethyl) perpropionate is 63%.

Example VIII

Tri (cumyl peroxy) borate is synthesized in substantially the same fashion employed in Example I, except that cumene is employed as the solvent. The solution contains 1.85 millimoles of hydroperoxide (after hydrolysis) per gram.

To ten parts of this solution are added 5.6 parts of pivalic acid and 0.16 part of concentrated $H_2SO_4$. The mixture is allowed to stand at room temperature with agitation for 20 hours. The yield of cumyl perpivalate is 52%.

Example IX

Tri (methylcyclohexyl peroxy) borate in methylcyclohexane is synthesized in substantially the same fashion employed in Example I. The solution contains 2.10 millimoles of hydroperoxide (after hydrolysis) per gram.

To ten parts of this solution are added 2.52 parts of acetic acid and 0.03 part of concentrated $H_2SO_4$. The mixture is allowed to stand at room temperature with agitation for 10 hours. The yield of methylcyclohexyl peracetate is 68%.

Example X

Tri (cyclohexyl peroxy) borate is synthesized in substantially the same fashion employed for the t-butyl derivative in Example I except that cyclohexane is employed as the solvent. The solution contains 1.40 millimole of hydroperoxide (after hydrolysis) per gram.

To ten parts of this solution are added 4.2 parts of nitroacetic acid and .028 part of concentrated $H_2SO_4$. The mixture is allowed to stand at room temperature with agitation for 12 hours. The yield of cyclohexylperoxy nitroacetate is 56%.

The foregoing description illustrates the methods of this invention whereby the flexibility and the advantages thereof are obtained. It will be understood that modifications and variations thereof may be effected by those skilled in the art without departing from the spirit of my invention. Accordingly, it is intended that all matter contained in the foregoing description shall be interpreted as illustrative and not in a limiting sense.

What is claimed is:

1. A process for the manufacturing of an organic perester which comprises reacting, in the liquid phase, at least one member of the group of organo-boron compounds selected from the group consisting of:

(a) $R_1\text{—O—}\overset{\overset{R_2}{|}}{\underset{\underset{O}{|}}{B}}\text{—O—}R_3$ and (b) $R_1\text{—O—}\overset{\overset{R_2}{|}}{\underset{}{B}}\underset{\diagdown O \diagup}{\overset{\diagup O \diagdown}{}} B\text{—O—}R_3$ wherein $R_1$, $R_2$ and $R_3$ are each selected from the group consisting of hydrogen, R and OR, at least one of $R_1$, $R_2$ and $R_3$ being OR, and R being selected from the group of hydrocarbyl organic radicals consisting of alkyls of 1–30 carbon atoms, cycloalkyls of 3–12 carbon atoms, lower alkyl substituted cycloalkyls of 4–20 carbon atoms and aralkyls of 7–20 carbon atoms with a mono- or dibasic hydrocarbyl aliphatic or aromatic carboxylic acid of 10 or fewer carbon atoms per molecule; said reaction being carried out at a temperature of —20° C. to 125° C. and at a pressure sufficient to maintain a liquid phase.

2. A process in accordance with claim 1 wherein R is a tertiary alkyl and the carboxylic acid is a monobasic alkyl carboxylic acid.

3. A process in accordance with claim 1 wherein R is a tertiary alkyl and the carboxylic acid is a monobasic aromatic carboxylic acid.

4. A process in accordance with claim 1 wherein the pressure is between about 1 p.s.i.a. to about 100 p.s.i.a.

5. A process in accordance with claim 1 wheren R is tertiary butyl and the carboxylic acid is selected from the group consisting of acetic acid, benzoic acid, pivalic acid and isobutyric acid.

References Cited

UNITED STATES PATENTS 3,264,274  8/1966  Leveskis _____ 260—453UX

OTHER REFERENCES

Steinberg: Organo Boron Chemistry, vol. I, pp. 478–483 (1964).

Johnson et al.: "Monobasic Carboxylic Acids," pp. 537 and 593.

Rodd, Chemistry of Carbon Compounds, vol. I (1951).

LEWIS GOTTS, Primary Examiner

G. HOLLRAH, Assistant Examiner